United States Patent
Yang et al.

(10) Patent No.: US 8,219,141 B2
(45) Date of Patent: Jul. 10, 2012

(54) SYSTEM WITH SHARED POWER AMPLIFIER FOR MOBILE COMMUNICATION TERMINAL WITH MOBILE RFID FUNCTION

(75) Inventors: Hoe-Sung Yang, Daejon (KR); Chan-Won Park, Daejon (KR); Dong-Han Lee, Daejon (KR); Ji-Hoon Bae, Daejon (KR); Hee-Sook Mo, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 675 days.

(21) Appl. No.: 12/299,808

(22) PCT Filed: May 10, 2007

(86) PCT No.: PCT/KR2007/002307
§ 371 (c)(1),
(2), (4) Date: Nov. 6, 2008

(87) PCT Pub. No.: WO2007/129870
PCT Pub. Date: Nov. 15, 2007

(65) Prior Publication Data
US 2009/0209283 A1 Aug. 20, 2009

(30) Foreign Application Priority Data

May 10, 2006 (KR) .................. 10-2006-0042105
Nov. 17, 2006 (KR) .................. 10-2006-0113794

(51) Int. Cl.
*H04M 1/00* (2006.01)
(52) U.S. Cl. ................... 455/552.1; 455/553.1
(58) Field of Classification Search ............... 455/552.1, 455/553.1
See application file for complete search history.

(56) References Cited

U.S. PATENT DOCUMENTS 5,638,399 A * 6/1997 Schuchman et al. .......... 370/324
(Continued)

FOREIGN PATENT DOCUMENTS

CN 1702663 11/2005
(Continued)

OTHER PUBLICATIONS

Sheng-Fuh R. Chang, et al., "A Dual-Band RF Transceiver for Multistandard WLAN Applications", 2005 IEEE Transactions on Microwave Theory and Techniques, vol. 53, No. 3, pp. 1048-1055, Mar. 2005.

(Continued)

*Primary Examiner* — Lincoln Donovan
*Assistant Examiner* — Ryan Jager
(74) *Attorney, Agent, or Firm* — Kile Park Goekjian Reed & McManus PLLC

(57) ABSTRACT

Provided is a power amplifier sharing system for a mobile communication system having a mobile Radio Frequency Identification (RFID) function, particularly, a power amplifier sharing system that can reduce the power consumption and the size of a circuit in a mobile communication terminal having a mobile RFID function. The system includes a mobile communication transceiver for transmitting/receiving a mobile communication signal; a mobile RFID transceiver for transmitting/receiving a mobile RFID signal; a power amplifier for amplifying a signal; a switch for connecting the mobile communication transceiver and the mobile RFID transceiver to the power amplifier; and a transceiver controller for controlling the switch and the power amplifier.

10 Claims, 4 Drawing Sheets

U.S. PATENT DOCUMENTS

| | | |
|---|---|---|
| 7,532,908 B2 * | 5/2009 | Rofougaran et al. ....... 455/552.1 |
| 7,933,577 B2 * | 4/2011 | Shin et al. ..................... 455/344 |
| 2005/0116050 A1 | 6/2005 | Jei et al. |
| 2006/0054708 A1 | 3/2006 | Koo et al. |
| 2007/0032250 A1 * | 2/2007 | Feher .......................... 455/456.2 |
| 2009/0209283 A1 * | 8/2009 | Yang et al. ................. 455/553.1 |
| 2010/0208852 A1 * | 8/2010 | Feher ............................ 375/343 |

FOREIGN PATENT DOCUMENTS

| | | |
|---|---|---|
| EP | 1 522 955 | 4/2005 |
| JP | 2002-269508 | 9/2002 |
| JP | 2002-353852 A1 | 12/2002 |
| JP | 2003-196617 | 7/2003 |
| KR | 1020020062409 | 7/2002 |
| KR | 1020040108479 | 12/2004 |
| KR | 1020050013233 | 2/2005 |
| KR | 10-2005-0033955 A1 | 4/2005 |
| KR | 1020050062168 | 6/2005 |
| KR | 1020060014289 | 2/2006 |
| KR | 1020060025150 | 3/2006 |

OTHER PUBLICATIONS

International Search Report, Application No. PCT/KR2007/002307, Dated Aug. 28, 2007.

* cited by examiner

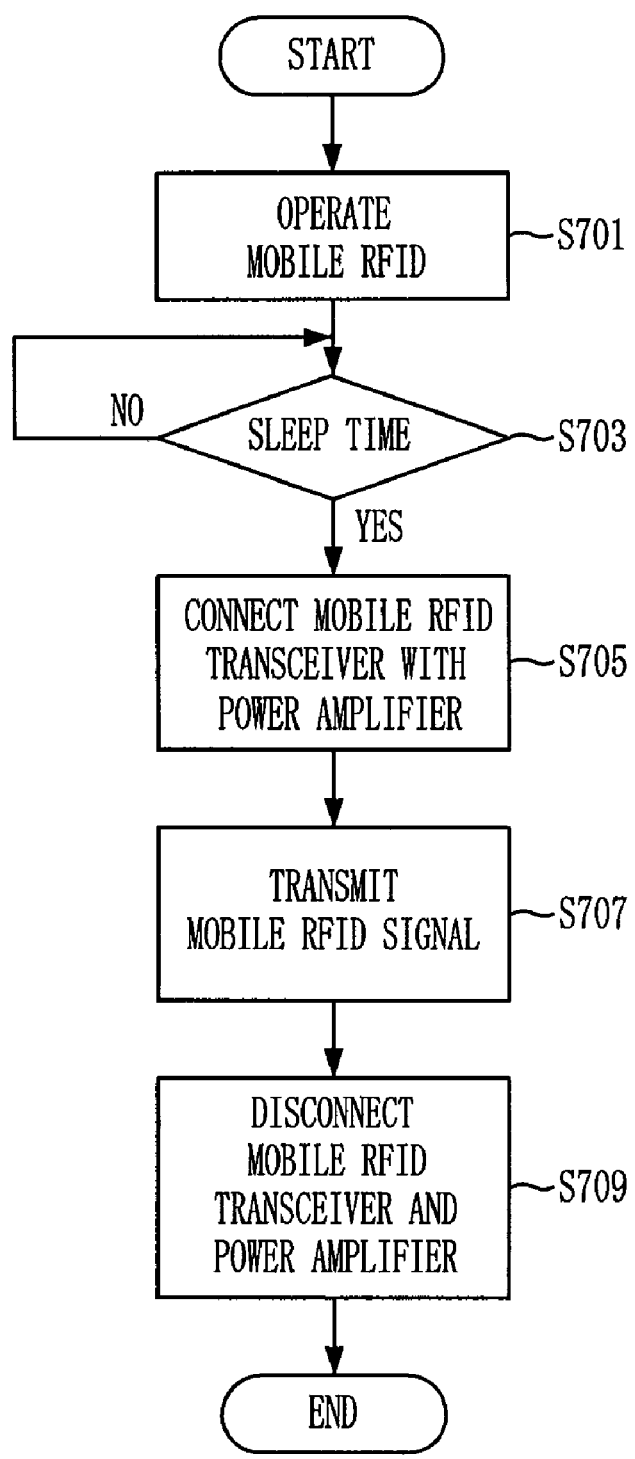

SYSTEM WITH SHARED POWER AMPLIFIER FOR MOBILE COMMUNICATION TERMINAL WITH MOBILE RFID FUNCTION

TECHNICAL FIELD

The present invention relates to a power amplifier sharing system for a mobile communication system having a mobile Radio Frequency Identification (RFID) function; and, more particularly, to a power amplifier sharing system for enabling a mobile communication terminal block and a mobile RFID reader block to share one power amplifier in a mobile communication terminal having a mobile RFID function.

BACKGROUND ART

FIG. 1 is a block diagram illustrating a conventional mobile communication terminal. As shown in FIG. 1, the conventional mobile communication terminal includes a transceiver 101 having a transmitter 111 and a receiver 113, a power amplifier 103, an isolator 105, a duplexer 107, and an antenna 109.

According to a signal transmitting process, the transceiver 101 transmits a signal through the transmitter 111, and the power amplifier 103 amplifies the transmitted signal. The isolator 105 prevents the system from being damaged by preventing the amplified signal from being reflected, and the duplexer 107 prevents a received signal from interfering a transmitting signal transmitted from the isolator 105. Then, the antenna 109 transmits a signal outputted from the duplexer 107.

According to a signal receiving process, the antenna 109 receives a signal, and the duplexer 107 prevents the transmitting signal from interfering the receiving signal. The receiver 113 receives a signal outputted from the duplexer 107.

FIG. 2 is a diagram illustrating a mobile communication transceiver shown in FIG. 1. As shown in FIG. 2, in the transmitter 111 of the mobile communication transceiver, a transmitting signal outputted from a base band system passes through an automatic gain control (AGC) and an intermediate frequency band pass filter (IF BPF), and a mixer modulates the passed signal using the signal of voltage controlled oscillator (VCO) as a reference. A drive amplifier (DA) amplifies the modulated signal, and the amplified signal is transmitted to a power amplifier (PA) through a radio frequency band pass filter (RF BPF).

In the receiver 113 of the mobile communication transceiver, a low noise amplifier (LNA) reduces noises of a receiving signal and amplifies only an original signal. A mixer demodulates the amplified signal after the amplified signal passes through the RF BPF, and the demodulated signal inputs into a base band system after passing through the AGC and the IF BPF.

FIG. 3 is a conventional mobile RFID reader. As shown in FIG. 3, the conventional mobile RFID reader includes a mobile RFID transceiver 301, a power amplifier 303, a circulator or a directional coupler 305, and an antenna 307.

According to a signal transmitting process, the mobile RFID transceiver 301 transmits a signal through the transmitter 309, and the power amplifier 303 amplifies the transmitted signal. The circulator or the directional coupler 305 separates the amplified signal from a receiving path, and the antenna 307 transmits the signal outputted from the circulator or the directional coupler 305.

According to a signal receiving process, the antenna 307 receives a signal, and the circulator or the directional coupler 305 separates the received signal from a transmitting path. The mobile RFID transceiver 301 receives the signal outputted from the circulator or the directional coupler 305 through the receiver 311.

Since the transmitting frequency and the receiving frequency are identical in the mobile RFID reader, the mobile RFID reader uses the circulator or the directional coupler for separating a transmitting signal path from a receiving signal path in order to reduce interference between the transmitting signal and the receiving signal.

FIG. 4 is a block diagram illustrating a mobile RFID transceiver of FIG. 3. As shown in FIG. 4, in a transmitter 309 of the mobile RFID transceiver, the transmitting signal passes an intermediate frequency band pass filter (IF BPF) and a modulator modulates the transmitting signal with a signal of a local oscillator LO as a reference. The modulated signal passes through a radio frequency band pass filter (RF BPF), and a drive amplifier (DA) amplifies the modulated signal and transmits the amplified signal to a power amplifier (PA).

In a receiver 311 of the mobile RFID transceiver, a receiving signal passes a radio frequency base band filter (RF BPF) and a demodulator demodulates the receiving signal using the signal of the LO as a reference. The demodulated signal passes through an intermediate frequency base band filter (IF BPF), and a gate amplifier (GA) amplifies the demodulated signal outputted from the IF BPF and transmits the amplified signal to a base band system.

As described above, the mobile communication terminal and the mobile RFID reader commonly include the power amplifier 103 or 303. Since a mobile communication terminal having a mobile RFID function is embodied by combining the mobile communication system and the mobile RFID reader, the mobile communication terminal having the mobile RFID function has two power amplifiers. One is for the mobile communication terminal and the other is for the mobile RFID reader. Therefore, the mobile communication terminal having the mobile RFID function has a problem of a complicated structure.

Since the power amplifier is large and consumes a great deal of power, the physical size of the terminal having two power amplifiers becomes larger and the power consumption thereof becomes increased.

DISCLOSURE

Technical Problem

An embodiment of the present invention is directed to providing a power amplifier sharing system for simplifying the structure of a terminal, reducing a physical size of a terminal, and reducing power consumption by allowing a mobile communication terminal block and a mobile RFID reader block to share one power amplifier in a mobile communication terminal having a mobile RFID function.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an power amplifier sharing system for a mobile communication terminal having a Mobile Radio Frequency Identification (RFID), which includes: a mobile communication transceiver for transmitting and receiving a mobile communication signal; a mobile RFID transceiver for transmitting and receiving a mobile RFID signal; a power amplifier for amplifying a signal; a switch for providing one of a signal outputted from the mobile communication transceiver and a signal outputted from the mobile RFID transceiver to the power amplifier; and a transceiver controller for selectively providing one of a signal outputted from the mobile communication transceiver and a signal outputted from the mobile RFID transceiver to the power amplifier by controlling the switch.

In accordance with an aspect of the present invention, there is provided a power amplifier sharing system for a mobile communication terminal having a mobile RFID function according to another embodiment of the present invention includes: a mobile communication transceiver for transmitting and receiving a mobile communication signal; a mobile RFID transceiver for transmitting and receiving a mobile RFID signal; a power amplifier for amplifying a signal; a combiner for providing a signal outputted from the mobile communication transceiver and a signal outputted from the mobile RFID transceiver to the power amplifier; and a transceiver controller for selectively providing one of the signal outputted from the mobile communication transceiver and the signal outputted from the mobile RFID transceiver to the power amplifier by controlling the mobile RFID transceiver.

Advantageous Effects

A power amplifier sharing system for a mobile communication terminal having a mobile RFID function according to an embodiment of the present invention can simplify the structure of the mobile communication terminal, reduce the physical size thereof, and reduce the power consumption by enabling a mobile terminal block and a RFID reader block to share one power amplifier in the mobile communication terminal having a mobile RFID function.

BRIEF DESCRIPTION OF THE DRAWINGS

FIG. 7 is a flowchart illustrating a control method in a transceiver controller of FIG. 5.

BEST MODE FOR THE INVENTION

A power amplifier sharing system for a mobile communication terminal having a mobile radio frequency identification (RFID) according to an embodiment of the present invention includes: a mobile communication transceiver for transmitting and receiving a mobile communication signal; a mobile RFID transceiver for transmitting and receiving a mobile RFID signal; a power amplifier for amplifying a signal; a switch for providing one of a signal outputted from the mobile communication transceiver and a signal outputted from the mobile RFID transceiver to the power amplifier; and a transceiver controller for selectively providing one of a signal outputted from the mobile communication transceiver and a signal outputted from the mobile RFID transceiver to the power amplifier by controlling the switch.

A power amplifier sharing system for a mobile communication terminal having a mobile RFID function according to another embodiment of the present invention includes: a mobile communication transceiver for transmitting and receiving a mobile communication signal; a mobile RFID transceiver for transmitting and receiving a mobile RFID signal; a power amplifier for amplifying a signal; a combiner for providing a signal outputted from the mobile communication transceiver and a signal outputted from the mobile RFID transceiver to the power amplifier; and a transceiver controller for selectively providing one of the signal outputted from the mobile communication transceiver and the signal outputted from the mobile RFID transceiver to the power amplifier by controlling the mobile RFID transceiver.

The advantages, features and aspects of the invention will become apparent from the following description of the embodiments with reference to the accompanying drawings, which is set forth hereinafter.

Figure 5:
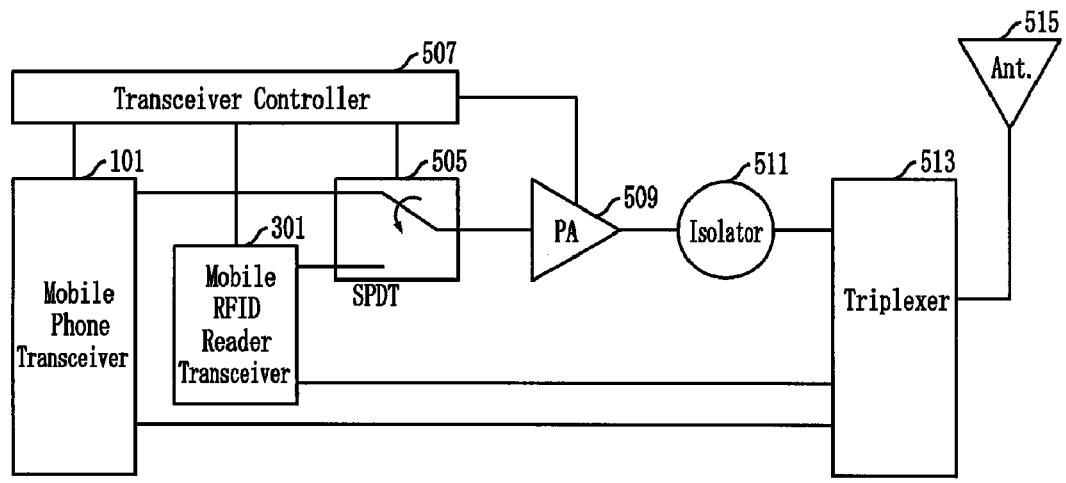
FIG. 5 is a block diagram illustrating a power amplifier sharing system in accordance with an embodiment of the present invention.

FIG. 5 is a block diagram illustrating a power amplifier sharing system in accordance with an embodiment of the present invention. Such a power amplifier sharing system can be used in a mobile communication terminal having a mobile RFID function.

As shown in FIG. 5, the power amplifier sharing system according to the present embodiment includes a mobile communication transceiver 101, a mobile Radio Frequency Identification (RFID) transceiver 301, a single-pole double-throw switch (SPDT) 505, a transceiver controller 507, a power amplifier 509, an isolator 511, a triplexer 513 and an antenna 515.

Figure 1:
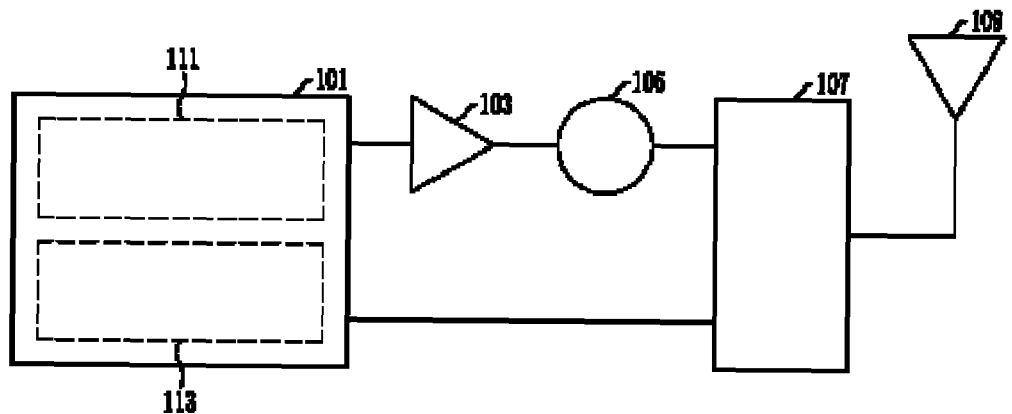
FIG. 1 is a block diagram illustrating a conventional mobile communication terminal.
Figure 2:
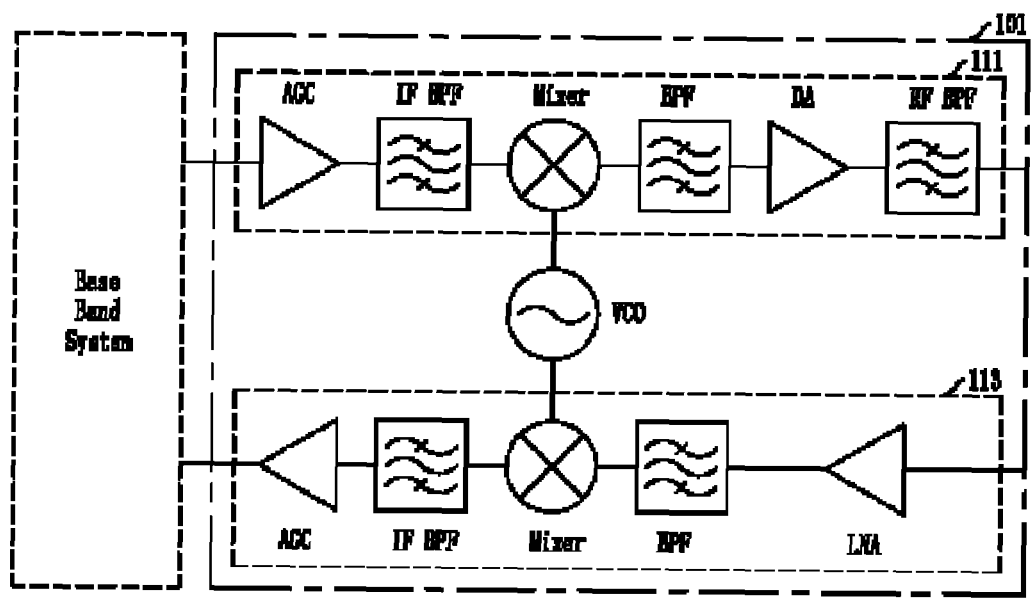
FIG. 2 is a block diagram illustrating a mobile communication transceiver of FIG. 1.
Figure 3:
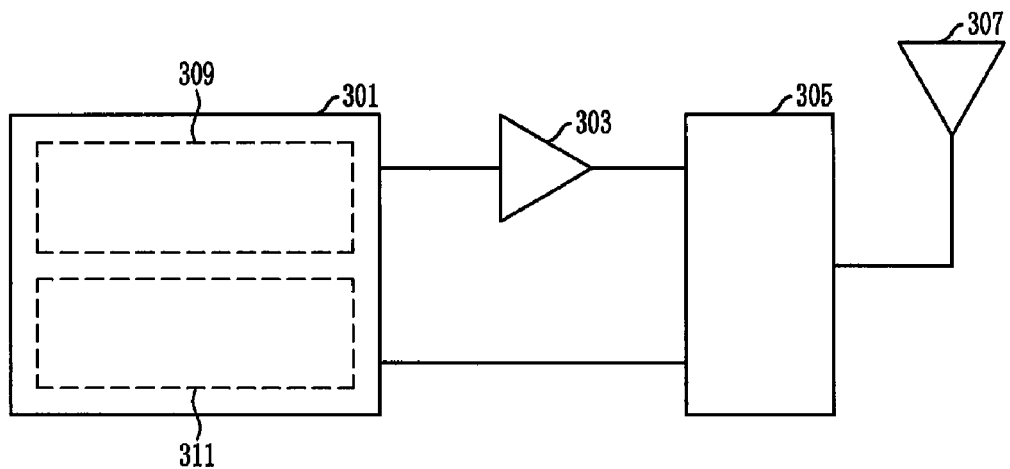
FIG. 3 is a block diagram illustrating a conventional mobile RFID reader.
Figure 4:
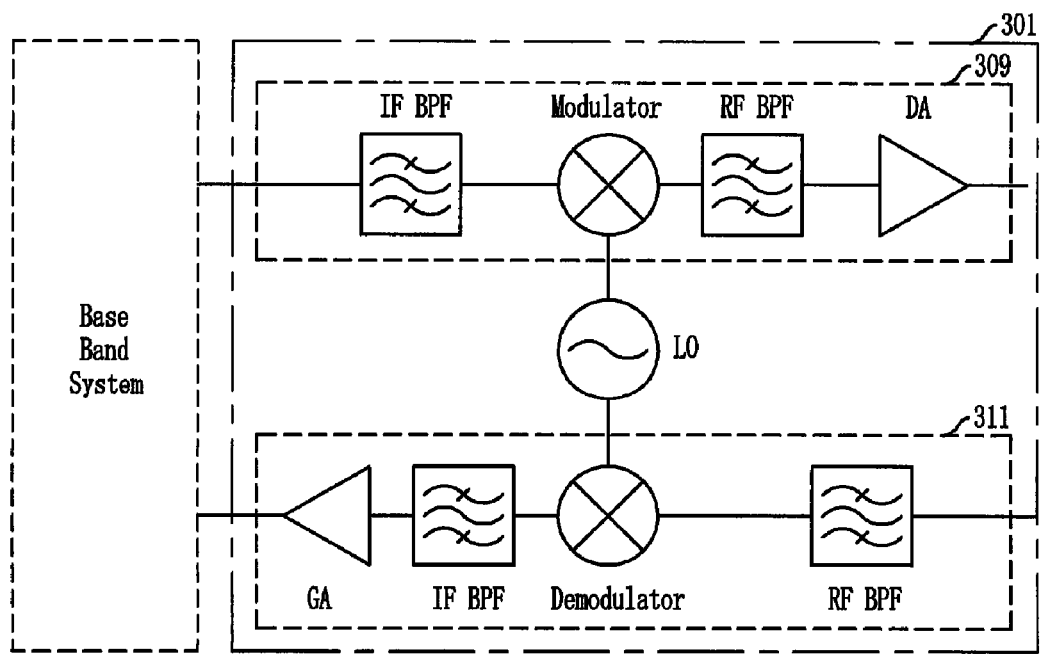
FIG. 4 is a block diagram illustrating a mobile RFID transceiver of FIG. 3.

The mobile communication transceiver 101 and the mobile RFID transceiver 301 correspond to the mobile communication transceiver 101 of FIG. 1 and the mobile RFID transceiver 301 of FIG. 3.

The single-pole double-throw switch 505 selectively provides signals outputted from the transmitter 111 of the mobile communication transceiver 101 and the transmitter 309 of the mobile RFID transceiver 301 to the power amplifier 509 according to the control of the transceiver controller 507.

The transceiver controller 507 controls the switching operation of the single-pole double-throw switch 507. Therefore, the transceiver controller 507 controls the single-pole double-throw switch 505 to provide the output signal of the mobile communication transceiver 101 to the power amplifier 509 when the mobile communication terminal having the mobile RFID function with the power amplifier sharing system operates as a mobile communication terminal. On the contrary, the transceiver controller 507 controls the single-pole double-throw switch 505 to provide the output signal of the mobile RFID transceiver 301 to the power amplifier 509 when the mobile communication terminal having the mobile RFID function with the power amplifier sharing system operates as a mobile RFID reader. As a result, the power amplifier 509 can selectively amplify one signal.

The transceiver controller 507 controls the amplifying gain of the power amplifier 509 in consideration of a transmitting/receiving signal power of the antenna 513 according to the output signal power of the mobile communication transceiver 101 and the mobile RFID transceiver 301. For example, if the transmitting/receiving signal power of the antenna 513 is about 20 and the output signal power of the mobile communication transceiver 101 is about 10, the transceiver controller 507 controls the power amplifier 509 to double the amplifying gain for the output signal of the mobile communication transceiver 101. If the transmitting/receiving signal power of the antenna 513 is about 20 and the output signal power of the mobile RFID transceiver 301 is about 5, the transceiver controller 507 controls the power amplifier 509 to quadruple the amplifying gain of the output signal of the mobile RFID transceiver 301.

The power amplifier 509 amplifies one selected by the single-pole double-throw switch 505 between the output signal outputted from the transmitter 111 of the mobile communication transceiver 101 and the output signal outputted from the transmitter 309 of the mobile RFID transceiver 301. As described above, the power amplifier sharing system according to the present embodiment enables the mobile communication transceiver 101 and the mobile RFID transceiver 301 to share one power amplifier.

The isolator 511 prevents the system from being damaged by preventing the amplified signal outputted from the power amplifier 509 from being reflected.

The triplexer 513 distinguishes the transmitting and receiving signals of the mobile communication transceiver 101 from the transmitting and receiving signals of the mobile RFID transceiver 301. The mobile communication transceiver is a dual frequency band system where a transmitting frequency is different from a receiving frequency, and the mobile RFID transceiver uses the same frequency as a transmitting frequency and a receiving frequency. Therefore, since the mobile communication transceiver 101 uses two frequency bands, and the mobile RFID transceiver 301 uses one frequency band, the power amplifier sharing system according to the present embodiment employs the triplexer 513.

The antenna 515 transmits and receives signals outputted from the triplexer 513 and signals received from the outside.

Figure 6:
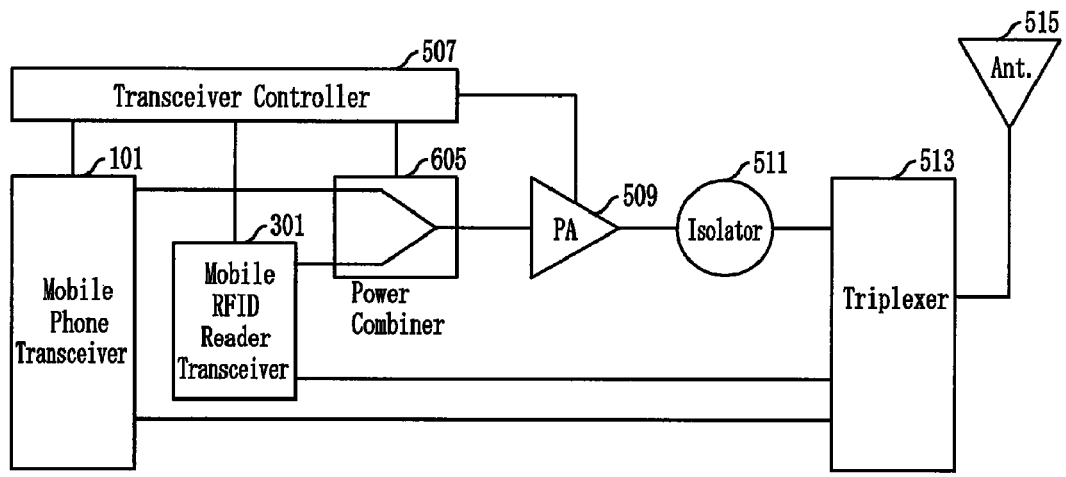
FIG. 6 is a block diagram illustrating a power amplifier sharing system in accordance with another embodiment of the present invention.

FIG. 6 is a block diagram illustrating a power amplifier sharing system in accordance with another embodiment of the present invention. The power amplifier sharing system according to another embodiment employs a power combiner instead of the single-pole double-throw switch 505.

As shown in FIG. 6, the power combiner 605 connects the mobile communication transceiver 101 and the mobile RFID transceiver 301 to the power amplifier 509.

The transceiver controller 507 enables the power amplifier 509 to selectively amplify one signal by controlling the signals outputted from the mobile communication transceiver 101 and the mobile RFID transceiver 301. Hereinafter, a control method of the transceiver controller 507 will be described with reference to FIG. 7.

FIG. 7 is a flowchart illustrating a control method of the transceiver controller of FIGS. 5 and 6.

Generally, the operating time of the power amplifier is about 30 us when the mobile RFID reader transmits a signal. And, the sleep time of the mobile communication transceiver is about 5 sec. That is, the operating time of the power amplifier to amplify a signal outputted from the mobile RFID transceiver 301 is shorter than the operating time of the mobile communication transceiver 101. The sleep time of the mobile communication transceiver denotes a time of not transmitting or not receiving a signal at the mobile communication transceiver.

Accordingly, the transceiver controller 507 according to the present embodiment controls the single-pole double-throw switch 505 or an output signal of the mobile RFID transceiver 301. The transceiver controller 507 basically connects the power amplifier 509 to the mobile communication transceiver 101, and controls the power amplifier 509 to be connected to the mobile RFID transceiver 301 only when the mobile RFID transceiver 301 transmits a mobile RFID signal and the mobile communication transceiver 101 is in an idle state. As a result, the power amplifier 509 can selective amplifies one of the output signal of the mobile communication transceiver 101 and the output signal of the mobile RFID transceiver 301. Therefore, the power amplifier sharing system according to the present embodiment enables the mobile communication transceiver 101 and the mobile RFID transceiver 301 to share one power amplifier.

As shown in FIG. 7, when the mobile RFID function is turned on at step S701, the transceiver controller 507 determines whether the mobile communication transceiver 101 is in an idle state or not at step S703. If the mobile communication transceiver 101 is in the idle state at step S703, the transceiver controller 507 connects the power amplifier 509 to the mobile RFID transceiver 301 by controlling a single-pole double-throw switch 505 or by controlling the output signal of the mobile RFID transceiver 301 at step S705. As a result, the mobile RFID signal outputted from the mobile RFID transceiver 301 is transmitted to the power amplifier 509 at step S707. After the mobile RFID signal is transmitted to the power amplifier 509, the transceiver controller 507 disconnects the power amplifier 509 with the mobile RFID transceiver 301 at step S709 by controlling the single-pole double-throw switch 505 or by controlling the output signal of the mobile RFID transceiver 301.

As described above, the transceiver controller 507 decides a signal to be amplified by the power amplifier 509 by connecting one of the mobile communication transceiver 101 and the mobile RFID transceiver 301 to the power amplifier 509.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

INDUSTRIAL APPLICABILITY

The power amplifier sharing system according to an embodiment of the present invention can simplify the structure of the terminal, reduce the physical size thereof, and reduce the power consumption by enabling a mobile terminal block and a RFID reader block to share one power amplifier in the mobile communication terminal having a mobile RFID function.

What is claimed is:
1. A power amplifier sharing system for a mobile communication terminal having a mobile Radio Frequency Identification (RFID), comprising:
 a mobile communication transceiver for transmitting/receiving a mobile communication signal;
 a mobile RFID transceiver for transmitting/receiving a mobile RFID signal;
 a power amplifier for amplifying a signal;

a switch for providing one of a signal outputted from the mobile communication transceiver and a signal outputted from the mobile RFID transceiver to the power amplifier;

a transceiver controller for selectively providing the one of a signal outputted from the mobile communication transceiver and a signal outputted from the mobile RFID transceiver to the power amplifier by controlling the switch; and a triplexer for distinguishing transmitting and receiving signals of the mobile communication transceiver from transmitting and receiving signals of the mobile RFID transceiver, and transmitting the distinguished transmitting and receiving signals to an antenna included in the terminal.

2. The power amplifier sharing system of claim 1, wherein the transceiver controller provides a signal outputted from the mobile communication transceiver to the power amplifier, and when the mobile communication transceiver is in an idle state, the transceiver controller provides a signal outputted from the mobile RFID transceiver to the power amplifier.

3. The power amplifier sharing system of claim 1, wherein the switch is a single-pole double-throw (SPDT) switch.

4. The power amplifier sharing system of claim 1, wherein the transceiver controller controls an amplifying gain of the power amplifier.

5. The power amplifier sharing system of claim 1, further comprising:

an isolator for preventing an amplified signal outputted from the power amplifier from being reflected.

6. A power amplifier sharing system for a mobile communication terminal having a mobile RFID function, comprising:

a mobile communication transceiver for transmitting/receiving a mobile communication signal;

a mobile RFID transceiver for transmitting/receiving a mobile RFID signal;

a power amplifier for amplifying a signal;

a combiner for separately providing a signal outputted from the mobile communication transceiver and a signal outputted from the mobile RFID transceiver to the power amplifier;

a transceiver controller for selecting one of the signal outputted from the mobile communication transceiver or the signal outputted from the mobile RFID transceiver to the power amplifier by controlling the mobile RFID transceiver such that after the signal outputted from the mobile RFID transceiver is transmitted to the power amplifier, the transceiver controller disconnects the power amplifier from the mobile RFID transceiver by controlling the output signal of the mobile RFID transceiver; and a triplexer for distinguishing transmitting and receiving signals of the mobile communication transceiver from transmitting and receiving signals of the mobile RFID transceiver, and transmitting the distinguished transmitting and receiving signals to an antenna included in the terminal.

7. The power amplifier sharing system of claim 6, wherein the transceiver controller provides a signal outputted from the mobile communication transceiver to the power amplifier, and when the mobile communication transceiver is in an idle state, the transceiver controller provides a signal outputted from the mobile RFID transceiver to the power amplifier.

8. The power amplifier sharing system of claim 6, wherein the combiner is a power combiner.

9. The power amplifier sharing system of claim 6, wherein the transceiver controller controls an amplifying gain of the power amplifier.

10. The power amplifier sharing system of claim 6, further comprising:

an isolator for preventing an amplified signal outputted from the power amplifier from being reflected.

* * * * *